United States Patent [19]

Campbell

[11] 4,016,145

[45] Apr. 5, 1977

[54] PRODUCTION OF AROMATIC SULFIDE/SULFONE POLYMERS

[75] Inventor: Robert W. Campbell, Bartlesville, Okla.

[73] Assignee: Phillips Petroleum Company, Bartlesville, Okla.

[22] Filed: Sept. 23, 1975

[21] Appl. No.: 616,094

Related U.S. Application Data

[63] Continuation-in-part of Ser. No. 495,450, Aug. 28, 1974, Pat. No. 3,919,177, which is a continuation-in-part of Ser. No. 416,776, Nov. 19, 1973, abandoned.

[52] U.S. Cl. .......................... 260/79.3 M; 260/49; 260/79; 260/79.1
[51] Int. Cl.² ........................................ C08F 28/00
[58] Field of Search ......... 260/79, 79.1, 49, 79.3 M

[56] References Cited

UNITED STATES PATENTS

| | | | |
|---|---|---|---|
| 3,819,582 | 6/1974 | Feasey | 260/49 |
| 3,919,177 | 11/1975 | Campbell | 260/79.1 |

*Primary Examiner*—Melvyn I. Marquis

[57] ABSTRACT

High molecular weight aromatic sulfide/sulfone polymers are produced by reacting a dihalo aromatic sulfone, an alkali metal sulfide other than lithium sulfide, an organic amide, and an alkali metal carboxylate. Use of the alkali metal carboxylate results in polymers of high molecular weight and satisfactory melt flow properties having utility as coatings, films, molded objects, fibers, and the like.

17 Claims, No Drawings

PRODUCTION OF AROMATIC SULFIDE/SULFONE POLYMERS

This application is a continuation-in-part application of my copending application having Ser. No. 495,450, filed Aug. 28, 1974, now U.S. Pat. No. 3,919,177, issued Nov. 11, 1975, which is a continuation-in-part application of Ser. No. 416,776, filed Nov. 19, 1973, now abandoned.

This invention relates to the production of polymers from aromatic compounds. In accordance with another aspect, this invention relates to a process for the production of high molecular weight aromatic sulfide/sulfone polymers by reacting a dihalo aromatic sulfone, a selected alkali metal sulfide, and an organic amide in the presence of an alkali metal carboxylate. In accordance with a further aspect, this invention relates to the production of p-phenylene sulfide/sulfone polymers by reacting a bis(p-halophenyl) sulfone, a selected alkali metal sulfide, and an organic amide in the presence of an alkali metal carboxylate.

In recent years, a wide variety of high polymers have been prepared, many of which are currently being produced and marketed on a large scale. While such polymers are useful in many areas, one property of high polymers, particularly those of the thermoplastic type, which needs to be improved is ability to withstand high temperature. Since thermoplastic materials can be molded rapidly and efficiently into almost any desired shape, they lend themselves to mass production. The high polymer, especially a thermoplastic material, which could stand very high temperatures and thus could be used in such areas as electrical components, wire coatings, automotive parts, and the like, has been the objective of a great deal of research.

Accordingly, an object of this invention is to produce aromatic sulfide/sulfone polymers exhibiting higher molecular weight than normally obtained.

Another object of this invention is to provide a process for producing high molecular weight aromatic sulfide/sulfone polymers exhibiting good melt processability properties.

It is another object of this invention to provide a method employing a specific type of compound for the preparation of aromatic sulfide/sulfone polymers of increased molecular weight suitable for injection molding.

Other objects and aspects as well as the several advantages of this invention are apparent from a study of this disclosure and the appended claims.

In accordance with this invention, in the production of an aromatic sulfide/sulfone polymer by employing a dihalo aromatic sulfone, an alkali metal sulfide other than lithium sulfide, and an organic amide, the use, additionally, of an alkali metal carboxylate results in an aromatic sulfide/sulfone polymer of higher molecular weight, as evidenced by a higher inherent viscosity, than that obtained without the use of the alkali metal carboxylate.

In one embodiment of the present invention, at least one dihalo aromatic sulfone such as a bis(p-halophenyl) sulfone, at least one alkali metal sulfide selected from the group consisting of sodium sulfide, potassium sulfide, rubidium sulfide, and cesium sulfide, at least one alkali metal carboxylate, and at least one organic amide are contacted under polymerization conditions for a period of time sufficient to form an aromatic sulfide/sulfone polymer.

In another embodiment of this invention, at least one dihalo aromatic sulfone is reacted, under polymerization conditions for a period of time sufficient to form an aromatic sulfide/sulfone polymer, with a mixture in which at least one alkali metal sulfide other than lithium sulfide, at least one alkali metal carboxylate, and at least one organic amide are contacted.

Dihalo aromatic sulfones that can be employed in the process of the invention have the formula

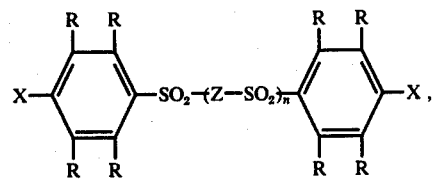

where each X is selected from the group consisting of fluorine, chlorine, bromine, and iodine; Z is a divalent radical selected from the group consisting of

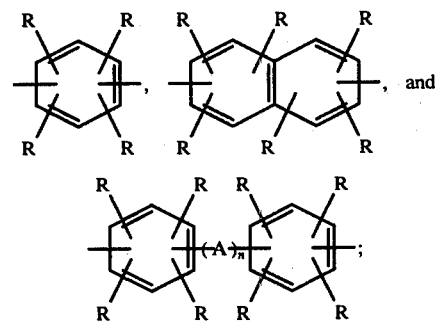

$n$ is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, each $n$ is 0.

Bis(p-halophenyl) sulfones are presently preferred reactants in the process of this invention and can be represented by the formula

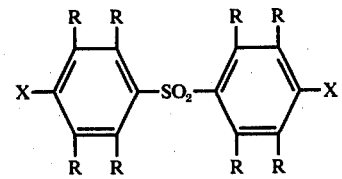

where each X is selected from the group consisting of fluorine, chorine, bromine, and iodine, and each R is selected from the group consisting of hydrogen and alkyl radicals having 1 to about 4 carbon atoms, the total number of carbon atoms in each molecule being within the range of 12 to about 24.

Examples of some dihalo aromatic sulfones that can be employed in the process of this invention include bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl 3-methy-4-fluorophenyl sulfone, bis(2-methyl-4-chlorophenyl) sulfone, bis(2,5-diethyl-4-bromophenyl) sulfone, bis(3-iospropyl-4-iodophenyl)

sulfone, bis(2,5-dipropyl-4-chloro-phenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsufonyl)benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl] ether, bis[p-(p-chlorophenylsulfonyl)phenyl] sulfide, bis[p-(p-chlorophenylsulfonyl)phenyl] sulfone, bis-[p-(p-bromophenylsufonyl)phenyl]methane, 5,5-bis[3-ethyl-4-(p-chlorophenylsulfonyl)phenyl]nonane, and the like, and mixtures thereof.

Alkali metal sulfides that can be employed in the process of this invention include sodium sulfide, potassium sulfide, rubidium sulfide, cesium sulfide, and mixtures thereof. The alkali metal sulfide can be used in anhydrous form, as a hydrate, or as an aqueous mixture.

Alkali metal carboxylates that can be employed in the process of this invention can be represented by the formula $R'CO_2M$ where $R'$ is a hydrocarbyl radical selected from alkyl, cycloalkyl, and aryl, and combinations thereof such as alkaryl, aralkyl, and the like, the number of carbon atoms in said $R'$ being within the range of 1 to about 20, and M is an alkali metal selected from the group consisting of lithium, sodium, potassium, rubidium, and cesium. Preferably, $R'$ is an alkyl radical having 1 to about 6 carbon atoms or a phenyl radical and M is lithium. If desired, the alkali metal carboxylate can be employed as a hydrate or as a solution or dispersion in water.

Examples of some alkali metal carboxylates that can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

The aromatic sulfide/sulfone polymers produced by the process of this invention can be characterized as having recurring

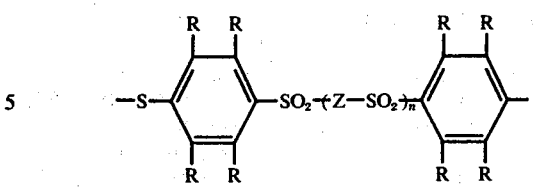

units, where each R, Z, and $n$ is as defined above.

A wide variety of reaction conditions can be employed in the practice of the invention. The reaction conditions under which the reactions involved in the invention will take place are within the scope of the invention. Similarly, any proportions of reactants which will react with each other to produce a product polymer of the invention are within the scope of the invention. However, as will be understood by those skilled in the art in view of this disclosure, certain reaction conditions and reactant proportions are favored for economic reasons, i.e., the reactions proceed faster and give greater yields for some reaction conditions and some proportions of reactants.

Although the mole ratio of dihalo aromatic sulfone to alkali metal sulfide can vary over a considerable range, generally it will be within the range of about 0.9:1 to about 2:1, preferably about 0.95:1 to about 1.2:1. When the polymer is to be employed in applications such as injection molding, where good melt processability is desired, a mole ratio of dihalo aromatic sulfone to alkali metal sulfide within the range of about 1:1 to about 1.03:1 is preferred. The mole ratio of alkali metal carboxylate to alkali metal sulfide can vary over a wide range but generally will be within the range of about 0.05:1 to about 4:1, preferably about 0.1:1 to about 2:1. The amount of organic amide can vary greatly, generally being within the range of about 100 grams to about 2500 grams per gram-mole of alkali metal sulfide.

Although the reaction temperature at which the polymerization is conducted can vary over a considerable range, generally it will be within the range of about 170° C to about 240° C, preferably about 180° C to about 220° C. The reaction time can vary widely, depending in part on the reaction temperature, but generally will be within the range of about 10 minutes to about 3 days, preferably about 1 hour to about 8 hours. The pressure should be sufficient to maintain the dihalo aromatic sulfone and organic amide substantially in the liquid phase.

It is to be understood that the process of this invention can be carried out by mixing the dihalo aromatic sulfone, the alkali metal sulfide, the alkali metal carboxylate, and the organic amide in any order. It is also to be understood that a composite can be formed of any two or more of these substances with the remaining substance or substances being introduced into the composite. Furthermore, it is to be understood that these substances can be employed in the form of aqueous mixtures or hydrates and that subsequent to any step of contacting substances, water can be removed from the resulting composition, e.g., by heating, distilling, and the like. For instance, water can be removed by distillation from a mixture of the organic amide, the alkali metal carboxylate, e.g., in anhydrous form or as a hydrate, and the alkali metal sulfide in hydrated form or as an aqueous mixture, after which the residual mixture can be admixed with the dihalo aromatic sulfone and the resulting mixture then maintained at polymerization conditions. In one presently preferred embodiment, the alkali metal sulfide, the alkali metal carboxylate, and the organic amide are combined to form a reactant mixture which is heated at an elevated temperature for a period of time sufficient to effect dehydration of the mixture followed by addition of the dihalo aromatic sulfone to the heated mixture, with or without cooling prior to addition of the sulfone, and then subjecting the resulting reaction mass to polymerization conditions which forms an aromatic sulfide/sulfone polymer. The heating can be carried out at a temperature in the range of about 170° C to about 240° C although temperatures of about 200° C to about 210° C have been found satisfactory. The sulfone is ordinarily added to the reactant mixture together with organic amide.

The aromatic sulfide/sulfone polymers produced by the process of this invention can be separated from the reaction mixture by conventional procedures, e.g., by filtration of the polymer, followed by washing with water, or by dilution of the reaction mixture with water, followed by filtration and water washing of the polymer. Preferably, at least a portion of the washing with water is conducted at an elevated temperature, e.g., within the range of about 130° C to about 250° C, preferably about 160° C to about 230° C, to provide a polymer which is low in ash-forming substances and is relatively light in color and of good clarity, as well as exhibiting good melt flow stability under conditions of melt processing operations such as injection molding.

The aromatic sulfide/sulfone polymers produced by the process of this invention can be blended with fillers, pigments, extenders, other polymers, and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, film, molded objects, and fibers. The polymers exhibit a good balance of properties for these uses, the heat deflection temperature being particularly outstanding.

EXAMPLES

In the following Examples, values for inherent viscosity were determined at 30° C in a 3:2 mixture, by weight, of phenol and 1,1,2,2-tetrachloroethane at a polymer concentration of 0.5 g/100 ml solution. Values for glass transition temperature ($T_g$) were determined on premelted and quenched polymer samples by differential thermal analysis. The values for polymer-melt temperature (PMT) were determined by placing portions of the polymer on a heated bar with a temperature gradient. The name poly(p-phenylene sulfide/sulfone) is used to describe an aromatic sulfide/sulfone polymer having recurring

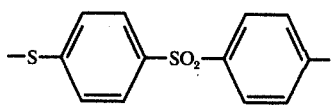

units in the polymer molecule.

EXAMPLE I

In a control run outside the scope of this invention, 65.2 g (60 percent assay, 0.5 mole) sodium sulfide, 0.2 g sodium hydroxide (to react with sodium bisulfide and sodium thiosulfide present in trace amounts in the sodium sulfide), and 158.3 g N-methyl-2-pyrrolidone were charged to a stirred 1-liter autoclave, which was then flushed with nitrogen. Dehydration of the mixture by heating to 205° C yielded 19 ml of distillate containing 18.2 g water. To the residual mixture were charged 143.6 g (0.5 mole) bis(p-chlorophenyl) sulfone (melting point, 146°–147° C) and 40 g N-methyl-2-pyrrolidone. The resulting mixture was heated for 5 hours at 200° C at a pressure of 40–45 psig. The reaction product was washed repeatedly with hot water and dried at 80° C under nitrogen in a vacuum oven to obtain a yield of 118.5 g of amorphous poly(p-phenylene sulfide/sulfone) having an inherent viscosity of 0.26, a $T_g$ of 205° C, and a PMT of 271° C.

EXAMPLE II

In a run within the scope of this invention, 65.2 g (60 percent assay, 0.5 mole) sodium sulfide, 0.2 g sodium hydroxide (to react with sodium bisulfide and sodium thiosulfate present in trace amounts in the sodium sulfide), 51.0 g (0.5 mole) lithium acetate dihydrate, and 158.3 g N-methyl-2-pyrrolidone were charged to a stirred 1-liter autoclave, which was then flushed with nitrogen. Dehydration of the mixture by heating to 205° C yielded 41 ml of distillate containing 33.0 g water. To the residual mixture were charged 143.6 g (0.5 mole) bis(p-chlorophenyl) sulfone (melting point, 146°–147° C) and 40 g N-methyl-2-pyrrolidone. The resulting mixture was heated for 5 hours at 200° C at a pressure of 25–40 psig. The reaction product was washed repeatedly with hot water and dried at 80° C under nitrogen in a vacuum oven to obtain a yield of 118.8 g of amorphous poly(p-phenylene sulfide/sulfone) having an inherent viscosity of 0.40, a $T_g$ of 215° C, and a PMT of 271° C.

Thus, based on inherent viscosity, the poly(p-phenylene sulfide/sulfone) produced in this Example was of much higher molecular weight than that produced in Example I, in which lithium acetate dihydrate was not employed.

Samples of the poly(p-phenylene sulfide/sulfone) produced in this Example were compression molded at a temperature of 290° C. Properties of the molded specimens are shown in Table I.

TABLE I

| | |
|---|---|
| Density, g/cc[a] | 1.4000 |
| Flexural Modulus, psi × 10$^{-3}$[b] | 383 |
| Tensile Break, psi[c] | 11,970 |
| Elongation, %[c] | 8 |
| Izod Impact Strength, ft-lb/in notch[d] | 0.48 |
| Heat Deflection Temperature, ° C at 264 psi[e] | 184 |
| Hardness, Shore D[f] | 86 |

[a]ASTM D 1505-68.
[b]ASTM D 790-70.
[c]ASTM D 638-68.
[d]ASTM D 256-70.
[e]ASTM D 648-56.
[f]ASTM D 2240-68.

As shown in Table I, the poly(p-phenylene sulfide/sulfone) exhibited a good balance of properties, the heat deflection temperature being particularly outstanding.

EXAMPLE III

In a control run outside the scope of this invention, without the use of a dehydration step as employed in Example I and with bis(p-chlorophenyl) sulfone from a different supplier, 65.2 g (60 percent assay, 0.5 mole) sodium sulfide, 0.2 g sodium hydroxide (to react with sodium bisulfide and sodium thiosulfate present in trace amounts in the sodium sulfide), 198.3 g N-methyl-2-pyrrolidone, and 143.6 g (0.5 mole) bis(p-chlorophenyl) sulfone (melting point, 146°–148° C) were charged to a stirred 1-liter autoclave, which was then flushed with nitrogen. The resulting mixture was heated for 5 hours at 200° C at a pressure of 45–55 psig. The reaction product was washed repeatedly with hot water and dried at 80° C under nitrogen in a vacuum oven to obtain a yield of 109.5 g of amorphous poly(p-phenylene sulfide/sulfone) having an inherent viscosity of 0.36, a $T_g$ of 209° C, and a PMT of 275° C.

EXAMPLE IV

In a run within the scope of this invention, without the use of a dehydration step as employed in Example II and using bis(p-chlorophenyl) sulfone from the supplier which provided the sulfone employed in Example III, 65.2 g (60 percent assay, 0.5 mole) sodium sulfide, 0.2 g sodium hydroxide (to react with sodium bisulfide and sodium thiosulfate present in trace amounts in the sodium sulfide), 51.0 g (0.5 mole) lithium acetate dihydrate, 198.3 g N-methyl-2-pyrrolidone, and 143.6 g (0.5 mole) bis(p-chlorophenyl) sulfone (melting point, 146°–148° C) were charged to a stirred 1-liter autoclave, which was then flushed with nitrogen. The resulting mixture was heated for 5 hours at 200° C at a pressure of 65–75 psig. The reaction product was washed repeatedly with hot water and dried at 80° C under nitrogen in a vacuum oven to obtain a yield of 116.9 g of amorphous poly(p-phenylene sulfide/sulfone) having an inherent viscosity of 0.52, a $T_g$ of 210° C, and a PMT of 275° C.

Thus, based on inherent viscosity, the poly(p-phenylene sulfide/sulfone) produced in this Example was of much higher molecular weight than that produced in Example III, in which lithium acetate dihydrate was not employed.

EXAMPLE V

In another control run outside the scope of this invention, employing a dehydration step as in Example I but with bis(p-chlorophenyl) sulfone from the supplier which provided the sulfone employed in Examples III and IV, 65.2 g (60 percent assay, 0.5 mole) sodium sulfide, 0.2 g sodium hydroxide (to react with sodium bisulfide and sodium thiosulfate present in trace amounts in the sodium sulfide), and 158.3 g N-methyl-2-pyrrolidone were charged to a stirred 1-liter autoclave, which was then flushed with nitrogen. Dehydration of the mixture by heating to 205° C yielded 16 ml of distillate containing 14.1 g water. To the residual mixture were charged 143.6 g (0.5 mole) bis(p-chlorophenyl) sulfone (melting point, 146°–148° C) and 40 g N-methyl-2-pyrrolidone. The resulting mixture was heated for 5 hours at 200° C at a pressure of 40–55 psig. The reaction product was washed repeatedly with hot water and dried at 80° C under nitrogen in a vacuum oven to obtain a yield of 121.9 g of amorphous poly(p-phenylene sulfide/sulfone) having an inherent viscosity of 0.29, a $T_g$ of 203° C, and a PMT of 275° C.

EXAMPLE VI

In a run within the scope of this invention, using bis(p-chlorophenyl) sulfone from the supplier which provided the sulfone employed in Example V, 65.2 g (60 percent assay, 0.5 mole) sodium sulfide, 0.2 g sodium hydroxide (to react with sodium bisulfide and sodium thiosulfate present in trace amounts in the sodium sulfide), 64.02 g (0.5 mole) lithium benzoate, and 158.3 g N-methyl-2-pyrrolidone were charged to a stirred 1-liter autoclave, which was then flushed with nitrogen. Dehydration of the mixture by heating to 205° C yielded 18 ml of distillate containing 12.4 g water. To the residual mixture were charged 143.6 g (0.5 mole) bis(p-chorophenyl) sulfone (melting point, 146°–148° C) and 40 g N-methyl-2pyrrolidone. The resulting mixture was heated for 5 hours at 200° C at a pressure of 30–45 psig. The reaction product was washed repeatedly with hot water and dried at 80° C under nitrogen in a vacuum oven to obtain a yield of about 118 g of amorphous poly(p-phenylene sulfide/sulfone) having an inherent viscosity of 0.51, a $T_g$ of 211° C, and a PMT of 275° C.

Thus, based on inherent viscosity, the poly(p-phenylene sulfide/sulfone) produced in this Example was of much higher molecular weight than that produced in Example V, in which lithium benzoate was not employed.

EXAMPLE VII

In a run within the scope of this invention, using a bis(p-chlorophenyl) sulfone: sodium sulfide mole ratio of 1.01:1, 65.2 g (60 percent assay, 0.5 mole) sodium sulfide, 0.2 g sodium hydroxide (to react with sodium bisulfide and sodium thiosulfate present in trace amounts in the sodium sulfide), 51.0 g (0.5 mole) lithium acetate dihydrate, and 158.3 g N-methyl-2-pyrrolidone were charged to a stirrer-equipped 1-liter autoclave, which was then flushed with nitrogen. Dehydration of the mixture by heating to 205° C yielded 39 ml of distillate containing 31.9 g water. To the residual mixture were charged 145.04 g (0.505 mole) bis(p-chlorophenyl) sulfone (melting point, 146°–148° C) and 40 g N-methyl-2-pyrrolidone. The resulting mixture was heated for 5 hours at 200° C at a pressure of 40–60 psig. The reaction product was washed repeatedly with hot water and dried at 80° C under nitrogen in a vacuum oven to obtain a yield of 122.2 g of amorphous poly(p-phenylene sulfide/sulfone) having an inherent viscosity of 0.37, a $T_g$ of 209° C, and a PMT of 275° C. The melt flow of this polymer, determined by the method of ASTM D 1238-70, modified to a temperature of 316° C using a 5-kg weight, was 8 g/10 min.

In another run within the scope of this invention, conducted essentially as the preceding run except that 143.6 g (0.5 mole) of bis(p-chlorophenyl) sulfone instead of 145.04 g was used, there was obtained 123.0 g of amorphous poly(p-phenylene sulfide/sulfone) having an inherent viscosity of 0.48, a $T_g$ of 219° C, and a PMT of 275° C. The melt flow of this polymer, determined as above, was only 1.6 g/10 min.

Thus, the poly(p-phenylene sulfide/sulfone) of higher melt flow prepared through use of bis(p-chlorophenyl) sulfone and sodium sulfide in a mole ratio of 1.01:1, respectively, was superior to the polymer obtained when the bis(p-chlorophenyl) sulfone and sodium sulfide were used in equimolar amounts for employment in applications such as injection molding where good melt processability is desired.

EXAMPLE VIII

A run was conducted in which beneficial effects of washing the poly(p-phenylene sulfide/sulfone) at relatively high temperatures were demonstrated.

To a stirrer-equipped 1-liter autoclave were charged 65.2 g (60 percent assay, 0.5 mole) sodium sulfide, 0.2 g sodium hydroxide (to react with sodium bisulfide and sodium thiosulfate present in trace amounts in the sodium sulfide), 51.0 g (0.5 mole) lithium acetate dihydrate, 198.3 g N-methyl-2-pyrrolidone, and 143.6 g (0.5 mole) bis(p-chlorophenyl) sulfone (melting point, 146°–148° C). After the autoclave was flushed with nitrogen, the mixture was heated for 5 hours at 200° C at a pressure of 65–80 psig. The cooled reaction product was washed eight times with hot (approximately 80° C) water. A minor portion of this washed product was dried at 80° C under nitrogen in a vacuum oven to obtain 17.4 g of amorphous poly(p-phenylene sulfide/sulfone) (Polymer A). The remainder of the washed product was subjected to further washing by stirring in an autoclave with 400 ml water at 200° C for 1 hour. The mixture was cooled and filtered, and the polymer was again washed by stirring in an autoclave with 400 ml water at 200° C for 1 hour. The mixture was then cooled and filtered, and the polymer was washed four times with hot (approximately 80° C) water, then dried at 80° C under nitrogen in a vacuum oven to obtain 103.3 g of amorphous poly(p-phenylene sulfide/sulfone) (Polymer B). Properties of Polymer A and Polymer B are summarized in Table II.

TABLE II

|  | Polymer A | Polymer B |
|---|---|---|
| Inherent Viscosity | 0.38 | 0.42 |
| Tg, ° C | 212 | 211 |
| PMT, ° C | 275 | 275 |
| Ash, weight %[a] | 0.44 | 0.06 |
| Incremental Melt Flow, g[b] | | |
| First Minute | 0.44 | 0.40 |
| Second Minute | 0.20 | 0.38 |
| Third Minute | 0.10 | 0.35 |
| Fourth Minute | 0.07 | 0.30 |
| Fifth Minute | 0.04 | 0.26 |
| Sixth Minute | —[c] | 0.23 |
| Seventh Minute | —[c] | 0.19 |
| Eighth Minute | —[c] | 0.15 |

[a]Determined by burning a sample in a crucible over an open flame, followed by further heating of the sample in a furnace at 1000° F (538+ C) for 4 hours.
[b]Determined by the method of ASTM D 1238-70, modified to a temperature of 316° C using a 5-kg weight, except that the weight in grams was determined for each one-minute interval during a period of 5–8 minutes.
[c]Not determined.

As shown in Table II, Polymer B, which had been washed with water at 200° C, gave a much lower value for ash than did Polymer A, which was washed only at the lower temperature. Also, Polymer B exhibited much greater melt flow stability under conditions of the melt flow test, a characteristic desirable in melt processing operations such as injection molding.

Small discs were compression molded at 295° C from Polymer A and Polymer B. The disc from Polymer A was dark brown and opaque whereas that from Polymer B was amber and clear. Thus, Polymer B was lighter in color and of greater clarity.

I claim:

1. A process for the production of high molecular weight aromatic sulfide/sulfone polymers which comprises contacting
   a. at least one dihalo aromatic sulfone represented by the formula

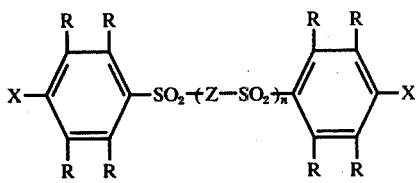

where each X is selected from the group consisting of fluorine, chlorine, bromine, and iodine; Z is a divalent radical selected from the group consisting of

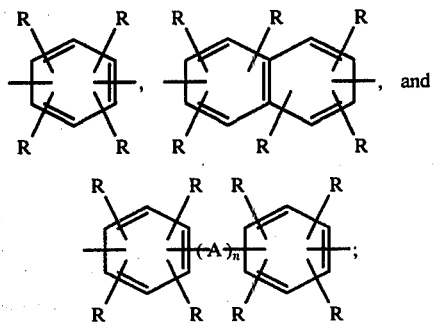

$n$ is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12,
   b. at least one alkali metal sulfide selected from the group consisting of sodium sulfide, potassium sulfide, rubidium sulfide, and cesium sulfide,
   c. at least one alkali metal carboxylate represented by the formula $R'CO_2M$ wherein $R'$ is a hydrocarbyl radical and M is an alkali metal, and
   d. at least one organic amide, under polymerization conditions including an elevated temperature, a period of time, and proportions of reactants sufficient to cause the reactants to react with each other and from an aromatic sulfide/sulfone polymer having recurring

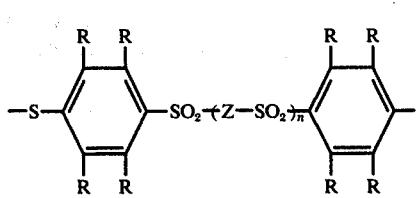

units, where each R, Z, and $n$ is as defined above.

2. A process according to claim 1 wherein
   c. is an alkali metal carboxylate wherein $R'$ is a hydrocarbyl radical having from 1 to about 20 carbon atoms, and
   d. is a cyclic or acyclic amide having from 1 to about 10 carbon atoms per molecule.

3. A process according to claim 1 wherein (a) can be represented by the formula

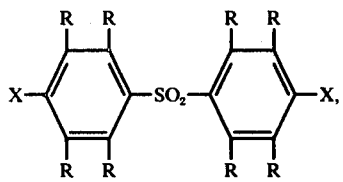

where each X is selected from the group consisting of fluorine, chlorine, bromine, and iodine, and each R is selected from the group consisting of hydrogen and alkyl radicals having 1 to about 4 carbon atoms, the total number of carbon atoms in each molecule being within the range of 12 to about 24,
  c. can be represented by the formula $R'CO_2M$ wherein $R'$ is a hydrocarbyl radical having from 1 to about 20 carbon atoms and M is an alkali metal, and
  d. is a cyclic or acyclic amide having from 1 to about 10 carbon atoms per molecule.

4. A process according to claim 1 wherein the temperature of the reaction is in the range of about 170° C to about 240° C under sufficient pressure to maintain liquid phase conditions and further wherein the mole ratio of (a) to (b) is in the range of 0.9:1 to 2:1, the mole ratio of (c) to (b) is in the range of 0.05:1 to 4:1, and the amount of (d) present is 100 grams to 2500 grams per gram mole of (b).

5. A process according to claim 1 wherein
  a. is bis(p-chlorophenyl) sulfone,
  b. is sodium sulfide,
  c. is lithium acetate dihydrate or lithium benzoate, and
  d. is N-methyl-2-pyrrolidone.

6. A process for the production of high molecular weight aromatic sulfide/sulfone polymers which comprises:
  1. forming a mixture comprising:
    a. at least one alkali metal sulfide selected from the group consisting of sodium sulfide, potassium sulfide, rubidium sulfide, and cesium sulfide,
    b. at least one alkali metal carboxylate represented by the formula $R'CO_2M$ wherein $R'$ is a hydrocarbyl radical and M is an alkali metal, and
    c. at least one organic amide,
  2. heating the mixture formed in (1) to an elevated temperature and for a period of time sufficient to effect dehydration of said mixture, and
  3. adding
    d. at least one dihalo aromatic sulfone represented by the formula

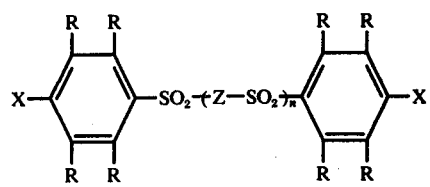

wherein each X is selected from the group consisting of fluorine, chlorine, bromine, and iodine; Z is a divalent radical selected from the group consisting of

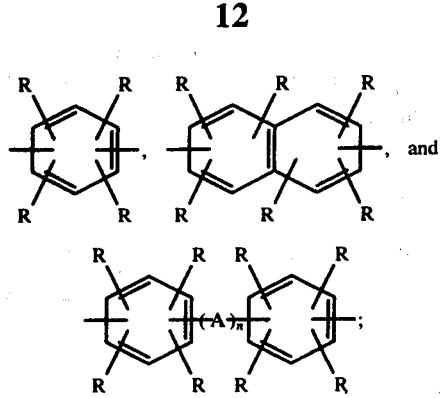

each n is 0 or 1:
A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12, to the heated mixture of (1) and subjecting the mixture thus formed to polymerization conditions including an elevated temperature, a period of time, and proportions of reactants sufficient to cause the reactants to react with each other and form an aromatic sulfide/sulfone polymer having recurring

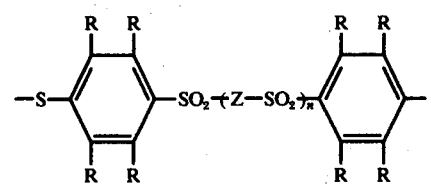

units, where each R, Z, and n is as defined above.

7. A process according to claim 6 wherein the heating of (2) is carried out under conditions such that the mixture is substantially dehydrated before addition of the dihalo aromatic sulfone and the mixture is cooled prior to addition of (d).

8. A process according to claim 6 wherein
  b. is an alkali metal carboxylate wherein $R'$ is a hydrocarbyl radical having from 1 to about 20 carbon atoms, and
  c. is a cyclic or acyclic amide having from 1 to about 10 carbon atoms per molecule.

9. A process according to claim 6 wherein (d) can be represented by the formula

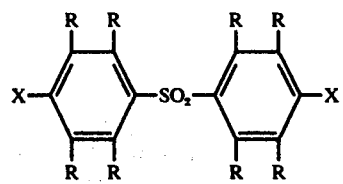

where each X is selected from the group consisting of fluorine, chlorine, bromine, and iodine, and each R is selected from the group consisting of hydrogen and alkyl radicals having 1 to about 4 carbon atoms, the total number of carbon atoms in each molecule being within the range of 12 to about 24,
  b. can be represented by the formula $R'CO_2M$ wherein $R'$ is a hydrocarbyl radical having from 1 to about 20 carbon atoms and M is an alkali metal, and c. is a cyclic or acyclic amide having from 1 to about 10 carbon atoms per molecule.

10. A process according to claim 6 wherein the temperature of the reaction is in the range of about 170° C to about 240° C under sufficient pressure to maintain liquid phase conditions and further wherein the mole ratio of (d) to (a) is in the range of 0.9:1 to 2:1, the mole ratio of (b) to (a) is in the range of 0.05:1 to 4:1 and the amount of (c) present is 100 grams to 2500 grams per gram mole of (a).

11. A process according to claim 6 wherein
a. is sodium sulfide,
b. is lithium acetate dihydrate or lithium benzoate,
c. is N-methyl-2-pyrrolidone, and
d. is bis(p-chlorophenyl) sulfone.

12. A process according to claim 1 wherein the temperature of the reaction is in the range of about 170° C. to about 240° C. and under sufficient pressure to maintain liquid phase condition and further wherein the mole ratio of (a) to (b) is 1:1 to 1.03:1 to produce an aromatic sulfide/sulfone polymer exhibiting good melt processability.

13. A process according to claim 6 wherein the temperature of the reaction is in the range of about 170° C. to about 240° C. and under sufficient pressure to maintain liquid phase conditions and further wherein the mole ratio of (a) to (b) is 1:1 to 1.03:1 to produce an aromatic sulfide/sulfone polymer exhibiting good melt processability.

14. A process according to claim 13 wherein
a. is bis(p-chlorophenyl) sulfone,
b. is sodium sulfide,
c. is lithium acetate dihydrate, and
d. is N-methyl-2-pyrrolidone.

15. A process according to claim 1 wherein the polymer produced is separated from the reaction mass and then washed with water, at least a portion of the washing being conducted at a temperature of 130°–250° C., for a period of time sufficient to yield a polymeric product exhibiting low ash values and high melt flow stability.

16. A process according to claim 15 wherein
a. is bis(p-chlorophenyl) sulfone,
b. is sodium sulfide,
c. is lithium acetate dihydrate, and
d. is N-methyl-2-pyrrolidone.

17. A process according to claim 6 wherein the polymer produced is separated from the reaction mass and then washed with water, at least a portion of the washing being conducted at a temperature of 130°–250° C., for a period of time sufficient to yield a polymeric product exhibiting low ash values and high melt flow stability.

* * * * *